United States Patent [19]

Kamov et al.

[11] 3,967,996

[45] July 6, 1976

[54] METHOD OF MANUFACTURE OF HOLLOW PIECES

[76] Inventors: Nikolai Ilich Kamov, ulitsa Gorkogo, 43, kv. 96; Nikolai Nikolaevich Priorov, ulitsa Novoslobodskaya, 57/60, kv. 9, both of Moscow; Anatoly Fedorovich Kovalev, ulitsa L.Tolstogo, 7, kv. 150, Moskovskaya oblast, Ljubertsy; Mark Alexandrovich Kupfer, ulitsa Festivalnaya, 19, kv. 9, Moscow; Alexandr Georgievich Satarov, ulitsa Sovkhoznaya, 24, korpus 2, kv. 8, Moskovskaya oblasti, Ljubertsy; Iosif Shulimovich Sherman, 9 Parkovaya, 49, korpus 1, kv. 32; Anatoly Filippovich Vakulenko, Leninsky prospekt, 66, kv. 264, both of Moscow; Igor Ivanovich Kovyryalkin, kvartal 2a, 20, kv. 49, Moscow, Lenino-Dachnoe; Stanislav Ivanovich Stetsenko, ulitsa L.Tolstogo, 11, kv. 40, Moskovskaya oblast, Ljubertsy; Vladimir Borisovich Golstman, ulitsa 8 Marta, 42, kv. 8, Moskovskaya oblast, Ljubertsy; Konstantin Nikolaevich Guskov, ulitsa 8 Marta, 40, kv. 18, Moskovskaya oblast, Ljubertsy, all of U.S.S.R.

[22] Filed: Oct. 4, 1974

[21] Appl. No.: 512,307

Related U.S. Application Data

[63] Continuation of Ser. No. 360,025, May 14, 1973, abandoned.

[52] U.S. Cl. ............................... 156/156; 156/222; 156/287; 244/17.11; 264/241; 416/226; 416/229 R

[51] Int. Cl.² .................. B29C 17/00; B29C 27/00; B64C 27/04

[58] Field of Search .......... 156/147, 156, 173, 182, 156/184, 185–191, 194, 198, 212, 221–224, 285–287, 293, 294, 475, 476; 264/239, 241, 248–250, 258; 416/223, 226, 229, 230, 232; 244/17.11

[56] References Cited

UNITED STATES PATENTS

| 2,155,375 | 4/1939 | Jablonsky | 156/297 |
|---|---|---|---|
| 2,202,042 | 5/1940 | Blount | 156/222 |
| 2,388,485 | 11/1945 | Jensen | 156/222 |
| 2,766,161 | 10/1956 | Hagopian et al. | 156/287 |
| 3,028,292 | 4/1962 | Hinds | 416/226 |
| 3,270,111 | 8/1966 | Haldemann | 156/156 |
| 3,321,019 | 5/1967 | Dmitroff et al. | 416/229 |
| 3,330,550 | 7/1967 | Brownlee | 156/287 |
| 3,333,642 | 8/1967 | Kee | 416/226 |
| 3,552,881 | 1/1971 | Rogers et al. | 416/226 |

*Primary Examiner*—Douglas J. Drummond
*Assistant Examiner*—John E. Kittle
*Attorney, Agent, or Firm*—Holman & Stern

[57] ABSTRACT

A method of manufacturing hollow pieces comprising the steps of forming a blank of single sheets each having a layer of gluing substance applied thereto; placing the blank onto an appropriate mandrel and subjecting it to a preliminary compression so as to impart to the blank a stiffness and to shape it into an unclosed profile as required for subsequent steps. Then the blank ends are brought together so as to define a cavity accommodating an elastic bag. The resulting blank is placed into a mould, and pressure is fed into the elastic bag to perform a final pressing.

The above-described method is preferably used to manufacture helicopter rotor blades of glass plastic, which have variable cross-sectional shape over their length and exhibit higher strength and longer service life as compared with metal blades.

12 Claims, 17 Drawing Figures

METHOD OF MANUFACTURE OF HOLLOW PIECES

This is a continuation of application Ser. No. 360,025, filed May 14, 1973, now abandoned.

BACKGROUND OF THE INVENTION

The present invention relates to the art of press moulding, and more particularly to a method of manufacturing hollow pieces.

The method according to the invention may be most advantageously used in the manufacture of the blades and spars of the helicopter rotors and steering rotors, the blades of the aircraft propellers and fan blades.

Methods of manufacturing hollow pieces by pressing a blank are widely known. The pieces obtained by these methods are of a constant cross-sectional shape over the entire length.

Furthermore, the methods of manufacturing metallic spars for the rotor blades of helicopters by pressing a blank with subsequent treatment thereof are also widely known.

By this method the blade spars made of an aluminium alloy are manufactured in the following manner. An aluminium alloy ingot is placed into a press chamber and is heated up to the plastic state. The press chamber is provided with a cavity corresponding to the shape of the outer surface of the spar with predetermined allowances for subsequent machining, as well as with a mandrel having a cross-sectional shape corresponding to the cross-sectional shape of the spar cavity. The mandrel and the cavity are disposed relative to each other so that the space defined therebetween corresponds to the spar wall's thickness with an allowance for machining. The blank portions, which are sectioned by the mandrel partitions, are pressed over the inner surface of the spar, whereafter they are welded under pressure and heat during the shaping of the outer surface in the press chamber cavity.

The resulting blank comprises a hollow press shaped piece of a constant cross-sectional shape. In order to obtain a spar from this piece, the latter is subjected to a number of production treatment steps including heat treatment, dressing, machining (milling, grinding, scraping, polishing), as well as twisting about the longitudinal axis, surface hardening, application of electrolytic coating. These steps are required to obtain sufficient mechanical properties and dynamic strength, a predetermined aerofoil shape, as well as corrosion resistance.

The above-mentioned production treatment steps require a large number of complicated, cumbersome and expensive equipment. A large volume of wastes results from this treatment.

In addition, by the above-described method a spar is obtained with a constant cross-sectional shape of the cavity over the entire length thereof, whereby rational arrangement of the blade based upon mass, aerodynamic and elastic characteristics determining the rotor efficiency and service life depending upon the dynamic strength conditions is limited. These characteristics include an optimum mass distribution over the length and width of the blade, a variable shape of the blade in a plan view, a variable arrangement to aerofoils as to the type and thickness thereof, great blade twist angles, elastic properties of the blade variable with the length, which are determined by its cross-sectional shape and wall thickness also variable over the length.

SUMMARY OF THE INVENTION

It is an object of the present invention to provide a hollow piece having a variable cross-sectional shape over its length, which does not require any subsequent treatment to achieve a predetermined shape of the outer surface thereof.

It is another object of the invention to obtain a hollow piece having high strength and reliability in operation.

Still another object of the invention is to provide a method of manufacturing hollow pieces which requires but a minimum number of production equipment having a long service life and operating with the employment of medium-skill operators.

With these and other objects in view a method of manufacturing hollow pieces by pressing a blank so as to impart to a piece a predetermined shape according to the invention comprises the steps of forming a blank of single flexible sheets each having a layer of a gluing substance applied thereto, said sheets being placed on a mandrel and subjected to a preliminary compression during which the agglutination of the sheets takes place so as to impart to the blank a stiffness and to shape it into an unclosed profile as required for subsequent steps, bringing the ends of the blank together so as to define a cavity of a closed profile, accommodating an elastic bag in said cavity and placing the blank into a mould having the inner surface corresponding to the outer surface of the piece with subsequent feeding of pressure into the elastic bag for a final pressing during which the hollow piece of a predetermined shape is obtained.

It is advantageous to make the blank composite so that each part of the blank be formed of single sheets and preliminarily compressed on an appropriate mandrel.

Preliminarily compressed component parts of the blank may be brought together so as to define a number of cavities separated from each other, an elastic bag being accommodated in each of said cavities to feed pressure therein in order to perform a final pressing.

This embodiment of the blank permits manufacturing pieces of intricate shape having a variable cross-sectional shape over the length thereof, well as the pieces with rational mass distribution, and to simplify the process of checking the blank quality.

The method according to the invention permits arranging in the blank during the forming thereof of the sheets structural members which are to be fixed during the preliminary compression.

Prior to the final pressing of the blank it is also possible to arrange therein structural members of the piece which are to be fixed during the final pressing.

It is also possible to arrange on the preliminarily compressed component parts of the blank structural members of the piece which are to be fixed thereon during an additional preliminary compression of the component parts of the blank.

Such an assembly method for structural members of the piece simplifies the assembly process and permits retainint the strength of the piece.

It is advantageous to use natural or synthetic fabrics as the sheets for forming the blank.

It is not less advantageous to use plies of natural or synthetic fiber as the sheets for forming the blank.

It is also advantageous to use foil as the sheets for forming the blank.

The selection of the material of the sheets for forming the blank is determined by the requirements to the mechanical properties of the piece, in particular to the tensile strength and bending strength, the strength under alternating loads, to the elasticity modulus under bending and twisting.

During the preliminary compression and final pressing the blank may be subjected to a thermal action.

In order to define the cavity, the ends of the blank may be overlapped.

In order to define the cavity, the ends of the blank may be also connected with a butt joint.

The type of connection between the blank ends and the component parts thereof is determined by the shape of the piece and structural members thereof, as well as by the strength requirements and by the production method requirements.

The experiments have shown that as the elastic bag it is advantageous to use the blank cavity sealed with a layer of a gluing material.

As the elastic bag the blank cavity may be used, which is tightly sealed by means of metal sheets comprising structural members of the piece, the joints between the sheets being sealed by means of elastic straps.

This employment of the cavity permits obtaining the pieces having airtight cavity, as well as the pieces having such shape of the cavity which makes the removal of the elastic bag difficult.

The method according to the invention permits obtaining laminated pieces of practically any desired cross-sectional shape which do not require any subsequent treatment. The pieces manufactured by the method according to the invention exhibit high strength, stiffness and reliability. In addition, the method according to the invention requires but a minimum number of simple production equipment having a long service life.

BRIEF DESCRIPTION OF THE DRAWINGS

Other objects and advantages of the method of manufacturing hollow pieces according to the invention will become apparent from the following detailed description of specific embodiments thereof with reference to the accompanying drawings, in which.

DETAILED DESCRIPTION OF THE PREFERRED EMBODIMENTS

The description of the method according to the invention will be made as applied to the manufacture of a spar 1 (FIGS. 1, 2) of a blade 2 of a helicopter rotor (not shown).

Figure 1:
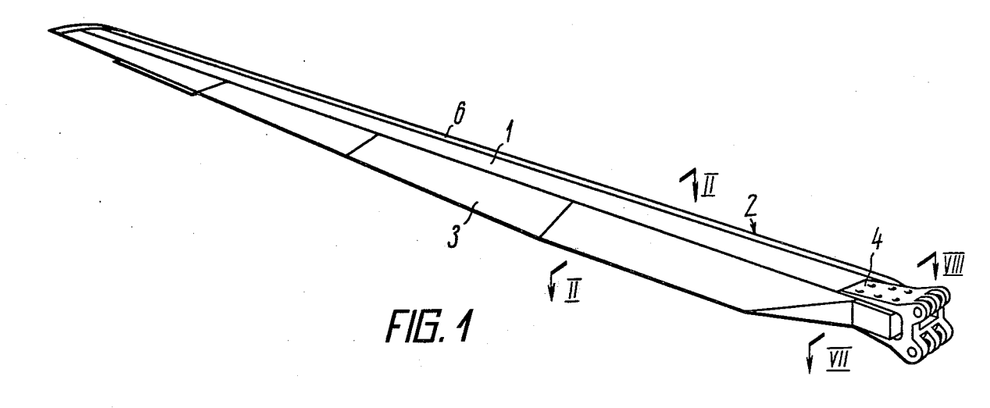
FIG. 1 shows a general view of the helicopter rotor blade.
Figure 2:
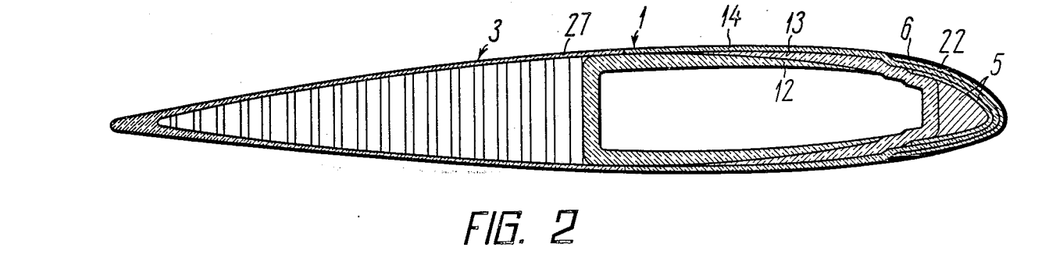
FIG. 2 is an enlarged sectional view taken along the line II — II in FIG. 1.

The blade 2 comprises the spar 1 which is the main load-carrying element of the blade to which there are fixed trailing edge sections 3, an attachment fitting 4, a balance weight 5 and an abrasion resistant film 6. The spar 1 together with the balance weight 5 and the abrasion resistant film 6 located in the leading edge portion of the blade 2, as well as the trailing edge sections 3 disposed in the trailing portion of the blade define the blade aerofoil.

The spar 1 of the blade 2 comprises a thin-walled beam having variable cross section over the length thereof and variable wall thickness over the length of the beam.

Figure 3:
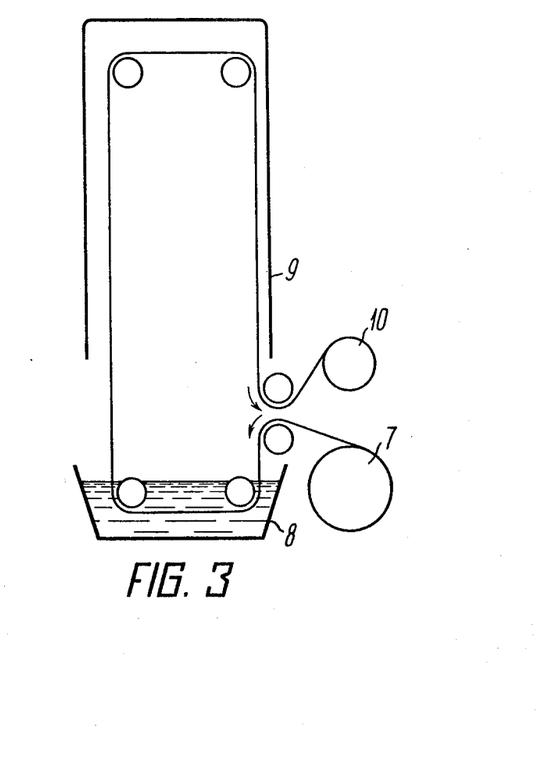
FIG. 3 schematically shows an apparatus for application of a gluing substance to a glass fabric.

According to the method of the invention the spar 1 is made of glass plastic, and for that purpose a reel 7 (FIG. 3) of glass fabric is mounted in a gluing machine having a bath 8 containing a gluing substance, such as an epoxy-phenolic binder. The glass fabric is taken off the reel 7 and fed into the bath 8, wherein it is impregnated with the above-mentioned gluing substance. From the bath 8 the glass fabric is fed into a drying chamber 9 for partial drying of the gluing substance which then becomes less sticky. Then the glass fabric is again wound into a reel 10.

Sheets 11 (FIG. 4) for forming a blank of the spar 1 are cut of the glass fabric treated as described hereinabove.

Figure 4:
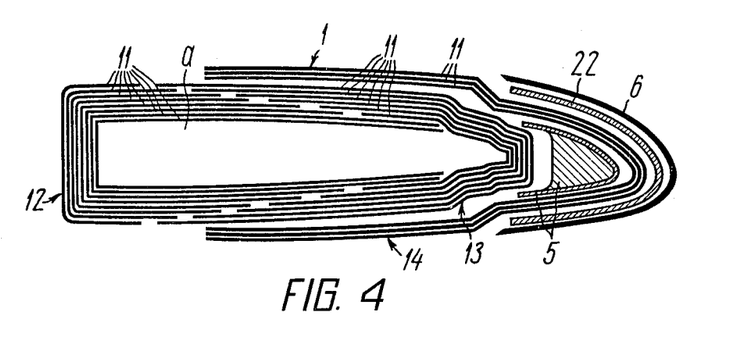
FIG. 4 schematically shows a blank of the spar of the helicopter rotor blade formed according to the invention of single component parts separated from each other for the sake of clarity.

The spar blank is a composite made of three parts 12, 13, 14 each having a C-shaped unclosed cross-sectional profile. These component parts are formed of the single sheets 11 cut by using a pattern.

The sheets of each component part are placed on a mandrel 15 (FIG. 5) having the outer surface corresponding to a given portion of the inner surface of the spar 1. The sheets 11 placed on the mandrel are held thereon by urging them against the mandrel by means of a rubber band 16. Then the mandrel 15 with the sheets 11 placed thereon is introduced into a tightly sealed elastic bag 17 (FIG. 6) made of rubberized fabric.

Figure 6:
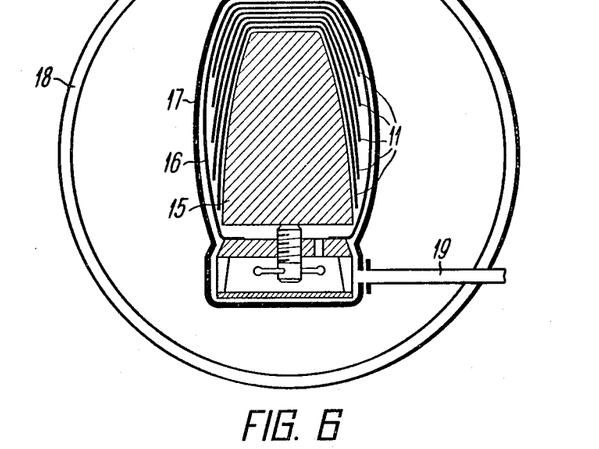
FIG. 6 shows a mandrel with the sheets arranged thereon according to the invention and placed in an autoclave.

The mandrel 15 with the sheets 11 and the elastic bag 17 is placed into an autoclave 18 for a preliminary compression.

The cavity of the elastic bag 17 is communicated by means of a pipe 19 with a vacuum pump (not shown). The preliminary compression consists in compressing the sheets 11 by means of the bag 17 and in heating them with air in the autoclave at 40° – 80°C during 10 – 40 minutes, whereby the agglutination, that is incomplete gluing of the sheets 11 together takes place. This incomplete gluing of the sheets together is necessary to impart to each component part of the blank a stiffness and shape required for subsequent treatment steps.

Figure 5:
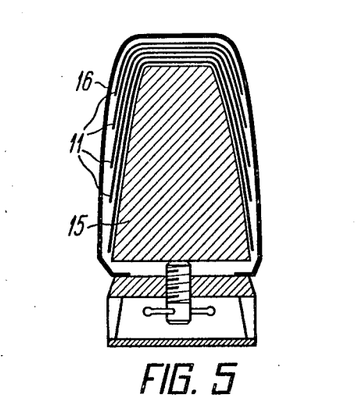
FIG. 5 shows the arrangement of the sheets on a mandrel to obtain a component part of the blank according to the invention.

After the preliminary compression of the component part 13 (which is still on the mandrel) a structural member of the blade 2, namely the balance weight 5, is mounted thereon. The sheets 11, which are to form the component part 14, are placed on the balance weight 5, and the preliminary compression is performed as described above. This compression is the primary one for the component part 14 and an additional (the secondary one) for the component part 13. During this compression the component part 13 located on the mandrel 15 together with the balance weight 5 mounted thereon defines the mandrel for the component part 14.

The sheets 11 of the component part 14 may be placed on their own mandrel (not shown), and the preliminary compression may be performed as described above. Then this component part 14 is removed from its mandrel and assembled with the preliminarily compressed component part 13 supported on its mandrel and with the balance weight 5, which is disposed between these component parts. The assembled parts are subjected to an additional compression in order to obtain better interfitting of the matching surfaces of these parts.

Figure 7:
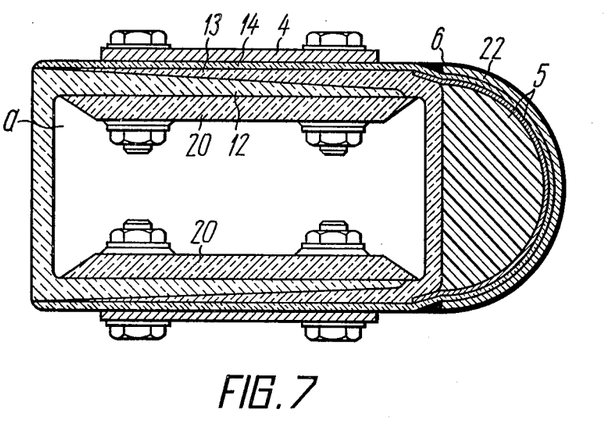
FIG. 7 is an enlarged sectional view taken along the line VII — VII in FIG. 1.

In order to reinforce the portion of the spar 1 located in the zone of the attachment fitting 4, the inner surfaces of the spar are provided with still another component part 20 (FIG. 7). This component part is formed of single sheets cut out by using patterns. The preliminary compression of this component part is performed in a press. The preliminary compression is performed for 10 – 40 minutes under a pressure of 1 – 1.5 kg/cm$^2$ at 40 – 80°C. The preliminary compression of the component part 20 may be performed in an autoclave as it has been described for the component parts 12, 13, 14. The method of the preliminary compression is selected depending upon the possibilities offered by the equipment and the production technique.

After the preliminary and additional compression steps the bank is assembled of the component parts 12, 13, 14 and 20 and the balance weight 5.

Figure 8:
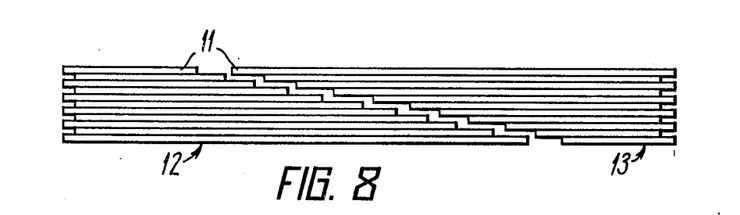
FIG. 8 is an embodiment of a joint between the ends of the component parts of the blank.

During the assembly of the blank the ends of the component parts 12 and 13 are brought together with an overlap as shown in FIG. 8 in such a manner that the above-mentioned parts define a cavity $a$ (FIG. 9) with the cross section shaped as closed profile. The interconnection of the component parts of the blank with the overlap joint ensures the strongest attachment therebetween. An elastic bag 21 made of rubber or other appropriate material is accommodated in the cavity $a$. Then the component part 14 with the balance weight 5 is placed on the component part 13. Prior to the assembly of the component parts 13 and 12 the component part 20 is mounted on the inner surface of the latter. After the placing of the component part 14 on its outer surface there are mounted structural members of the blade — the abrasion resistant film 6 adapted to protect the tip of the blade 2 against abrasive wear, and deicing means 22 providing for the protection of the blade against icing, said means comprising an electric heater element.

Figure 9:
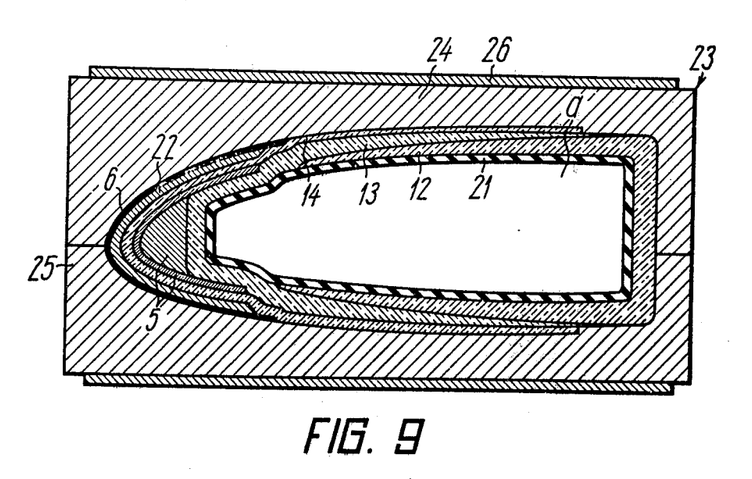
FIG. 9 shows a spar blank placed into a mould.

The blank of the spar 1 of the blade 2, which is thus assembled, is placed into a mould 23, the inner surface of the mould corresponding to the outer surface of the spar 1. The mould consists of two halves 24 and 25 which are rigidly interconnected after the blank has been placed into the mould. The mould 23 is provided with a heater element 26 which is adapted to exert thermal action upon the blank. The cavity of the elastic bag 21 is communicated with a source of compressed gas (not shown). The final pressing consists in a gradual heating of the blank up to 150° – 250°C with concurrent increase in the pressure of gas fed into the elastic bag up to 5 – 15 kg/cm$^2$ and in an exposure under these conditions for 1 – 8 hours, whereafter a gradual cooling and pressure reduction are performed.

The elastic bag 21, which is removed from the cavity of the spar 1 withdrawn from the mould 23, can be reused.

Skins 27 (FIG. 2) of the trailing edge sections 3 of the blade 2 may be made of glass plastic, and for that purpose the blank is formed of the glass fabric sheets each having a layer of a gluing substance applied thereto. These sheets are stacked on appropriate mandrels and subjected to a preliminary compression. The preliminary compressed skin blanks are placed into a mould of an appropriate shape and subjected to the pressing as hereinabove described.

Figure 10:
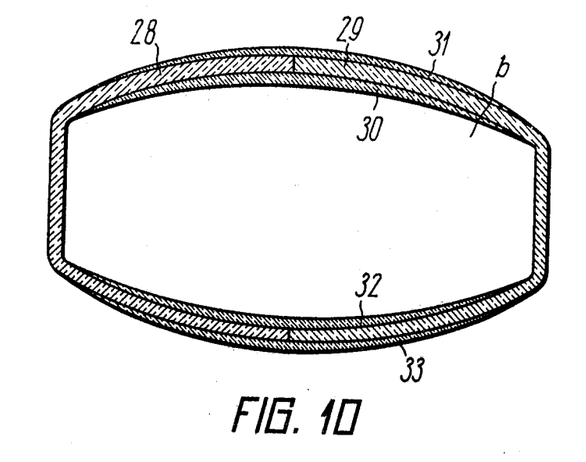
FIG. 10 is an embodiment of a hollow piece with the walls having different thickness in the cross section.

The method according to the invention may be used in the manufacture of heavy-duty load-carrying elements of stabilizing and steering planes of aircrafts, in particular controls and elevators, ailerons, flaps, tailplane and fin torque boxes. FIG. 10 shows the cross section of such a load-carrying element. Component parts 28 and 29 of the blank are formed of glass fabric sheets, while component parts 30, 31, 32 and 33 located in the maximum stress zone are formed of carbonized fiber fabric sheets. Upon being preliminarily compressed, these component parts are assembled in the following manner; the ends of the component parts 28 and 29, which are to define a cavity $b$, are brought together with the formation of a butt joint, whereas the component parts 30, 31, 32 and 33 are placed on their inner and outer surface with an overlap so as to overlap the joint between the component parts 28 and 29.

Figure 11:
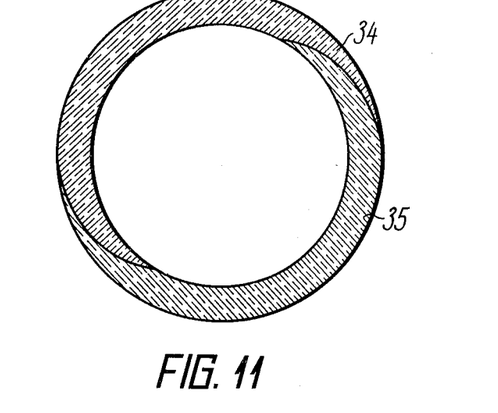
FIG. 11 is an embodiment of a hollow piece made of a blank consisting of two component parts.

FIG. 11 shows the cross section of a tubular piece, which is arcuated lengthwise and has variable diameter and wall thickness over the length thereof. It is expedient to manufacture this piece of a blank consisting of two component parts 34, 35 with their ends connected with an overlap joint.

Hollow conical or cylindrical pieces of a circular cross section and variable wall thickness over the length of the piece are formed of single sheets and subjected to a preliminary compression, whereby a C-shaped blank is obtained. Then the ends of the blank are brought together with an overlap, and the blank is subjected to the final pressing as hereinabove described.

Figure 12:
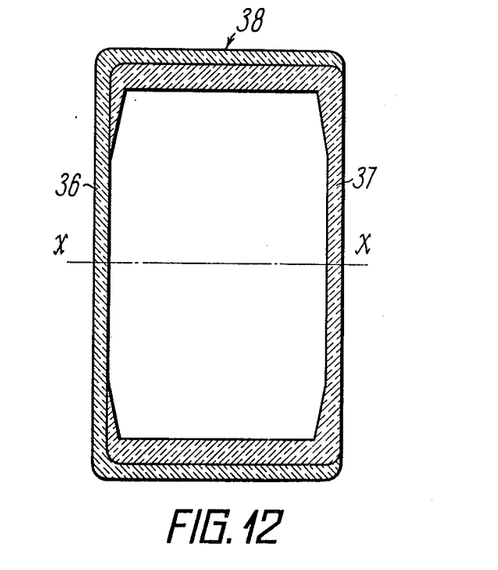
FIG. 12 is another embodiment of a hollow piece made of a blank consisting of two component parts.

FIG. 12 shows the cross section of a box-shaped load-carrying structural element having variable (or constant) cross-sectional dimensions and wall thickness over the length. Such elements may be the most advantageously used as beams performing for bending. The blank of the piece consists of two component parts 36, 37 having the ends connected with an overlap and defining enlarged flanges 38 to increase moment of inertia and section modulus about the axis X.

Depending upon the purpose of the structure and the loads upon the structure the material of the sheets used to form the blank component parts may comprise synthetic or natural fabrics, as well as foil. These materials can be used both separately and in combinations.

Figure 13:
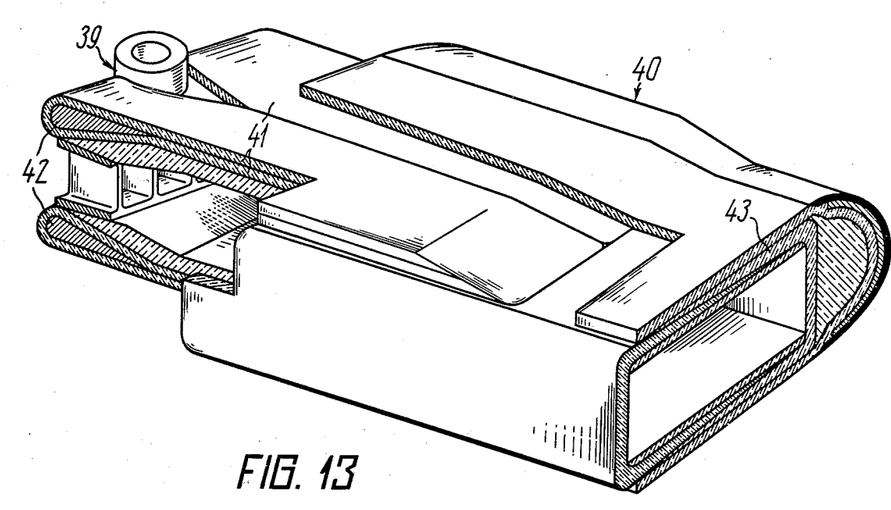
FIG. 13 shows the connection between a blade attachment fitting and the spar.

FIG. 13 shows the interconnection of a metal attachment fitting 39 and a spar 40 made by the method according to the invention by using plies of natural and synthetic fiber to form a component part 41 of the spar blank. For that purpose said plies are placed around projections 42 of the part 39 to define loops around these projections, said projections constituting the mandrels for these plies during the preliminary compression thereof. Then the preliminarily compressed component part 41 and a component part 43 (formed and preliminarily compressed similarly to the component part 12) are interconnected with their ends with an overlap joint, and an additional pressing is performed to fix their arrangement relative to each other. The spar blank is then assembled and pressed as hereinabove described.

The employment of natural or synthetic fiber plies for bolt-less fastening of the spar to metal fittings adapted for attachment of the blade to the hub of the rotor, tractor propeller or tail rotor contributes to a considerable increase in the service life of the piece, improves the reliability and reduces the piece weight due to the elimination of the stress concentration, which would take place in the bolt holes, an increase in the effective area of the material performing in the fastening zone and more efficient utilization of anisotropic properties of the ply-based plastic.

Figure 14:
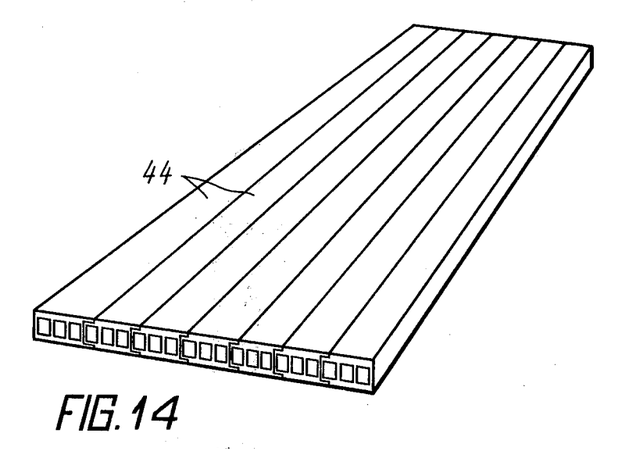
FIG. 14 shows a panel assembled of sections according to the invention.
Figure 15:
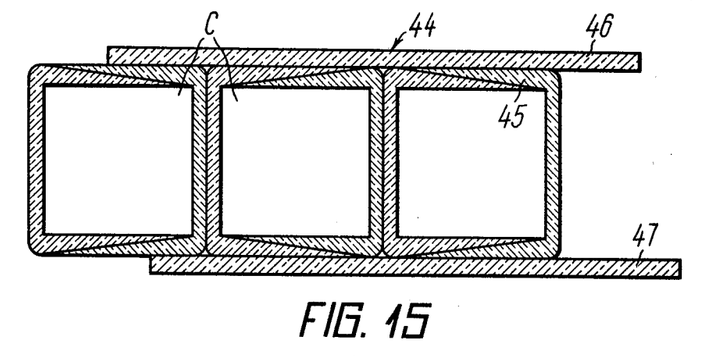
FIG. 15 shows a transverse sectional view of a section of said panel formed of the component parts defining a number of cavities.

The method according to the invention may be used in the manufacture of panels (FIG. 14), one section 44 of the panel being shown in FIG. 15. Each of these sections has a number of cavities $c$ separated from each other. Each cavity $c$ is defined between two component parts 45. Each of these parts is formed of sheets each provided with a layer of a gluing substance preliminarily applied thereto. The sheets are placed on appropriate mandrels and are subjected to a preliminary compression as described hereinabove similarly to the manufacture of the spar 1 of the blade 2.

Component parts 46, 47 are formed and preliminarily compressed similarly to the component parts 20 described hereinabove. After each component part 45, 46, 47 has been preliminarily compressed, their ends are brought together with an overlap joint so as to define a number of cavities $c$.

Then an elastic bag is introduced into each cavity $c$, and the blank, which is thus assembled, is placed into an appropriate mould for the final pressing performed as hereinabove described. After the piece has been withdrawn from the mould, the elastic bags are removed from their cavities $c$.

Since the component parts 46, 47 mainly take up the compressive and tensile loads in the panels, it is advantageous to use foil or natural or synthetic fiber plies to form these parts disposing them normally or at an angle relative to the longitudinal axis of the section.

In manufacturing the pieces having a single or several cavities, in which there are considerable restrictions, which would hamper the removal of the elastic bag after the pressing step, as well as in the case of making pieces of the recipient type (in order to tightly seal its cavity) or in manufacturing the spar of the helicopter rotor blade having a pneumatic alarm system indicating the beginning of the destruction thereof, it is advantageous to use as the elastic bag for the final pressing the cavity of the blank which should be tightly sealed with a layer of a gluing substance. In order to seal the cavity the gluing substance may comprise the film utilized for making the bag, the film shape corresponding to that of the cavity profile.

During the pressing the film adheres to the cavity surface and tightly seals it.

Figure 16:
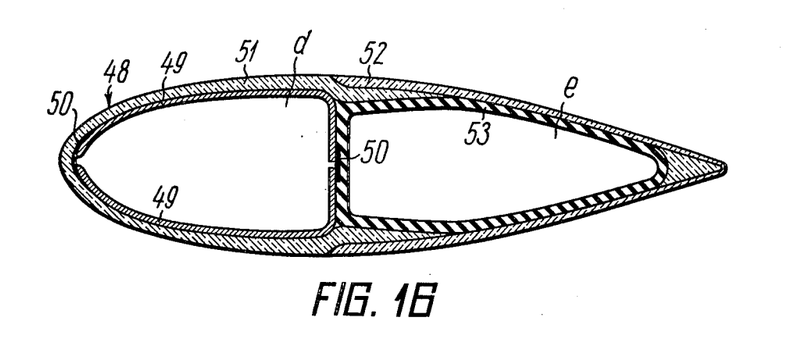
FIG. 16 schematically shows a tailplane of an aircraft having structural members utilized as elastic bags during the manufacturing by the method according to the invention.

In order to ensure required characteristics of the elasticity and strength of a piece, such as a tailplane 48 (FIG. 16) of an aircraft in manufacturing it by the method according to the invention, a combination of glass plastic and sheet metal may be used. Structural members 49 made of sheet metal are located on the inner surface of the tailplane 48 in a cavity $d$. Elastic straps 50 are disposed on the joints between these members. The members 49 and the straps 50 define an elastic bag, into which pressure is fed for the final pressing. Upon feeding pressure during the pressing step the members 49, while moving apart, transmit the pressure to component parts 51, 52 made of glass plastic. Concurrently the pressure is fed into an elastic bag 53, which is accommodated in a cavity $e$ and removed therefrom after the final pressing has been completed.

Experimental blades manufactured by the method according to the invention have been mounted on the helicopter Ka-15

Figure 17:
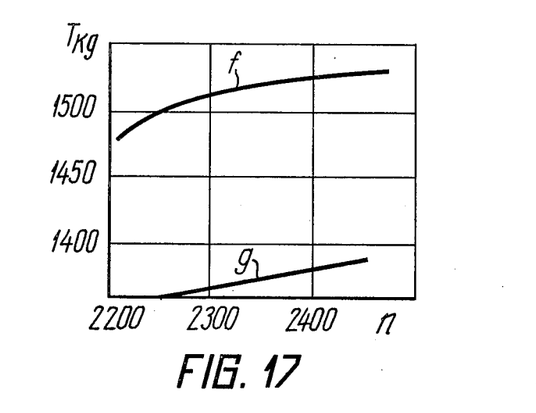
FIG. 17 represents the comparison between the characteristics of the helicopter blades manufactured by the known method and by the method according to the invention respectively.

The load-carrying system of the helicopter comprises two co-axially mounted rotors each having three blades. FIG. 17 shows the gain in the lift of the experimental blades (curve $f$) as compared with several made metallic blades having the spar of pressed aluminium alloy (curve $g$), with T = lift force of the helicopter rotor blades (kg) and $n$ = rpm of the engine. The experimental blades had the same weight as the metallic ones and have been in operation on the helicopter for 4000 hours without failure under normal operating conditions, while the metallic blades have the guaranteed service life of 600 hours only.

It is to be understood that various modifications may be made in the method of manufacturing hollow pieces according to the invention which was herein described as non-restrictive example by those skilled in the art without departing from the spirit and scope of the invention.

What is claimed is:

1. A method of manufacturing hollow blades and hollow blade spars of aircraft rotors having a variable cross-sectional shape, comprising the steps of: making a composite blank by first assembling each component part thereof from separate flexible flat sheets cut from an adhesive-covered cloth of material which sheets are placed one onto another on a rigid mandrel having an outer surface corresponding with the inner surface of the blade; subjecting each of the component parts assembled of separate sheets and lying on the rigid mandrel to a preliminary compression which consists of applying pressure and heat to the sheets to cause agglutination of the sheets and forming a component part of a blank having an unclosed profile and a rigidity sufficient for subsequent steps; assembling the component parts so as to form a cavity of a closed profile; placing an elastic bag into the cavity; placing the blank assembled of its component parts and with the elastic bag in its cavity into a mold whose inner surface corresponds with the outer surface of the blade; and performing final pressing by supplying pressure into the elastic bag and heating the blank whereby the blade of a specified shape is produced.

2. A method of manufacturing hollow blades and hollow blade spars of aircraft rotors having a variable cross-sectional shape, comprising the steps of: making a composite blank by first assembling each component part thereof from separate flexible flat sheets cut from an adhesive covered cloth of material which sheets are placed one onto another on a rigid mandrel having an outer surface corresponding with the inner surface of the blade; subjecting each of the component parts assembled of separate sheets and lying on the rigid mandrel to a preliminary compression which consists of applying pressure and heat to the sheets to cause agglutination of the sheets and forming a component part of a blank having an unclosed profile and a rigidity sufficient for subsequent steps; assembling the component parts so as to form a number of cavities of a closed profile separated from one another; placing an elastic bag into each of the cavities; placing the blank assembled of its component parts and with the elastic bags in its cavities into a mold whose inner surface corresponds with the outer surface of the blade; and performing final pressing by supplying pressure into the elastic bags and heating the blank whereby the blade of a specified shape is produced.

3. The method according to claim 1, further comprising the step of mounting structural members in each component part assembled from the sheets, the members being fixed during the preliminary compression.

4. The method according to claim 2, further comprising the step of mounting structural members in each component part assembled from the sheets, the members being fixed during the preliminary compression.

5. The method according to claim 1, further comprising the step of mounting structural members in each component part when assembling the component parts to form the blank, the members being fixed during the final pressing.

6. The method according to claim 2, further comprising the step of mounting structural members in each component part when assembling the component parts to form the blank, the members being fixed during the final pressing.

7. The method according to claim 1, wherein used as the material for the sheets are natural or synthetic fabrics.

8. The method according to claim 2, wherein used as the material for the sheets are natural or synthetic fabrics.

9. The method according to claim 1, wherein used as the material for the sheets is foil.

10. The method according to claim 2, wherein used as the material for the sheets is foil.

11. The method according to claim 1, further comprising the steps of utilizing the blank cavity as the elastic bag; mounting metal sheets in the cavity; and sealing the joints between the sheets with elastic straps.

12. The method according to claim 2, further comprising the steps of utilizing the blank cavities as the elastic bags; mounting metal sheets in the cavities; and sealing the joints between the sheets with elastic straps.

* * * * *